United States Patent [19]

Dawson

[11] 4,038,015
[45] July 26, 1977

[54] HYDRAULIC INJECTION MOLDING MACHINE WITH COMPRESSION RAM

[75] Inventor: James Earl Dawson, Lebanon, Ohio

[73] Assignee: Cincinnati Milacron, Inc., Cincinnati, Ohio

[21] Appl. No.: 647,741

[22] Filed: Jan. 9, 1976

[51] Int. Cl.² .............................................. B29F 1/00
[52] U.S. Cl. ................ 425/451.7; 425/451; 425/DIG. 221
[58] Field of Search ............... 425/450.1, 451.7, 451.6, 425/451.5, DIG. 221, 451, 451.2; 83/527, 529; 72/441, 446

[56] References Cited

U.S. PATENT DOCUMENTS

| 3,590,437 | 7/1971 | Annis et al. ............... 425/DIG. 221 |
| 3,603,248 | 9/1971 | Novel ..................... 100/257 X |
| 3,669,599 | 12/1970 | Snider et al. ............. 425/451.7 X |
| 3,734,673 | 5/1973 | Paterson et al. .......... 425/451.6 X |

Primary Examiner—Richard B. Lazarus
Attorney, Agent, or Firm—Daniel P. Worth

[57] ABSTRACT

An injection molding machine has an improved lock and block system wherein the lock recess on the ram is defined between the parallel faces of a pair of spaced apart rings. The lock recess is established at a preselected position by sliding various ones of the rings longitudinally forward or rearward on the compression ram to coincide with a preselected advance position of the compression ram (blocking ram) on which is mounted the movable platen. The rings may be spaced apart by a magnetic spacer which is positioned where it will not be struck by moving parts of the machine. At least one jackhole or toolhole is provided in the side of the ring so that it can be separated from adjacent machine elements during set up operations.

15 Claims, 4 Drawing Figures

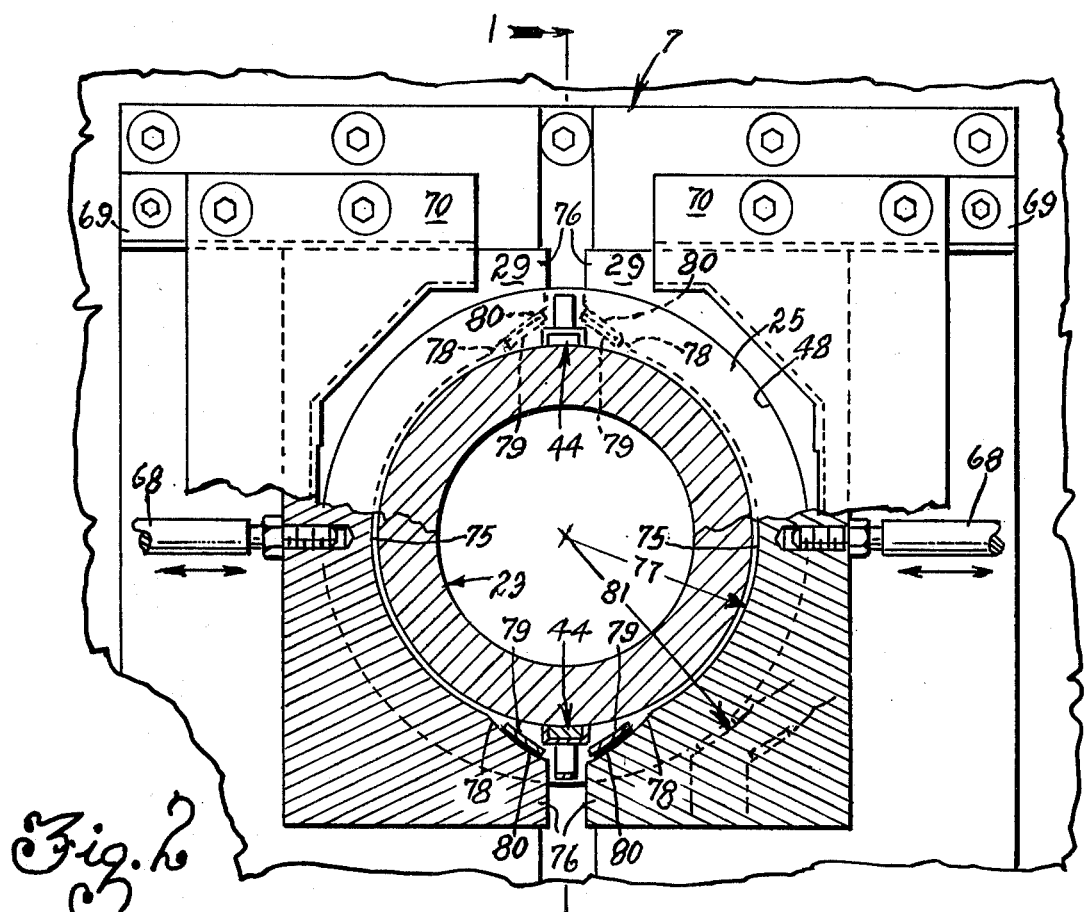
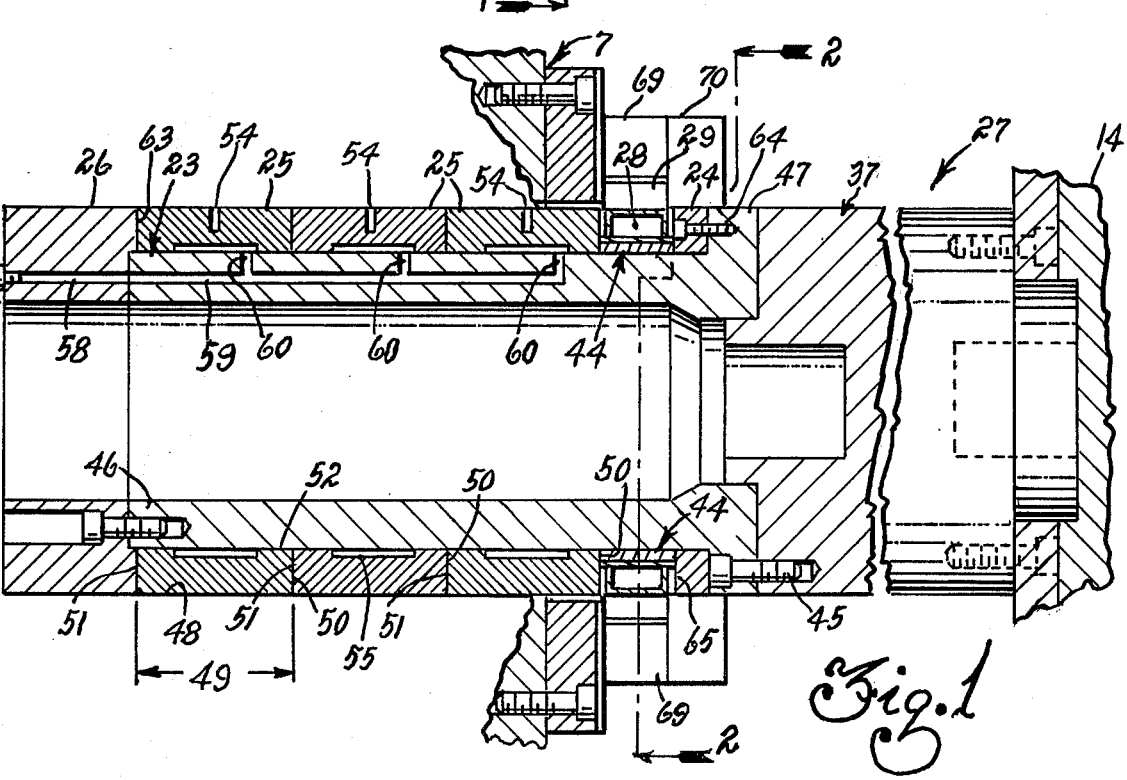

HYDRAULIC INJECTION MOLDING MACHINE WITH COMPRESSION RAM

SUMMARY AND BACKGROUND OF THE INVENTION

The present invention relates to an improved lock and block system for holding in a preselected position the compression ram (blocking ram) on which is mounted the movable platen of a hydraulic injection molding machine. One aspect of the invention relates to improvements in the lock and block system wherein the compression ram supports a plurality of longitudinally movable spacer rings and defines a lock recess by spacing apart at least one of said rings from an opposite side of said lock recess.

Heretofore, hydraulic injection molding machine for exerting large clamping forces (e.g. 1000 tons clamping force and larger) have commonly used a lock-and-block system to hold the moving platen into position during the injection part of a molding process. Typically, this involves locking the ram on which is mounted the moving platen in position once it has been fully advanced to a position where the mold is closed and ready to receive plastic or other material under pressure. Also, typically, the locking means comprises a key or lock member which moves laterally out of the machine to engage a lock recess fashioned on the distal portion of the ram. In turn, the ram is a member which is moved longitudinally of the machine to assist in positioning the moving platen. The engagement of the lock or key with the lock recess is typically called a lock-and-block system.

The prior art also typically provides the lock recess by providing on the ram distal end a series of spaced apart flanges. The space between each two flanges comprises the lock recess into which the aforesaid lock can be moved. A plurality of such recesses are provided to permit the molding machine to be set up or to be adjusted for a number of different mold heights. This construction has ordinarily resulted in the mold clamping force being applied to one of the flanges in such manner as to flex the flange. Repeated force application on these flanges has on occasion led to fatigue failure with disastrous results to the machine structure.

The present invention is directed to an improved lock-and-block construction which greatly reduces and, indeed, may even eliminate fatigue failure, provides a more economical and reliable construction, and employs materials that are easier to handle and easier to fabricate. For example, the prior art flanges had the load or force applied close to their periphery and were often made of carefully machined bearing steel, whereas the present invention employs a ductile cast iron ring that is loaded in compression.

The present invention provides an improved blocking ram construction in a lock-and-block clamping force applying means which holds in a fully advanced position the movable platen of a hydraulic injection molding machine by engaging with a laterally moving key a lock recess provided in the tail section of the blocking ram which ram moves longitudinally through the stroke of the machine and holds the platen in such a manner that the key or lock fits the lock recess to block the ram and platen from any substantial movement away from the fully advanced position. The improved construction comprises: the tail section having a rear segment; a plurality of spacer rings mounted on the rear segment; a front section of said ram having a preselected diameter and which is secured to the moving platen and extends longitudinally a portion of the distance to the ram tail section; the rear segement has a cylindrical sleeve portion of a diameter less than said ram front section diameter; each ring of said plurality of annular spacer rings has an outer diameter substantially that of said ram front section, a predetermined longitudinal length, front and rear faces that are substantially parallel and an inner diameter approximately but slightly larger than that of said sleeve portion, at least one of said rings being movable longitudinally on said cylindrical sleeve portion, the longitudinal dimensions of the respective rings providing means for mold height adjustment; and the lock recess is provided by the longitudinal dimension between the opposing faces to any two selected rings and longitudinally of a size to receive the key. Thus, the machine can be adjusted so its blocking ram moves to a preselected one of a number of predetermined advanced positions which is coincident with the location of said recess whence the platen can be moved to the fully advanced position and, if molds be present, to hold the same closed while the lock-and-block construction resists opening of the mold during a molding procedure.

Other objects, advantages and features will be appreciated from a reading of the following specification in conjunction with the annexed drawing, wherein:

FIG. 1 is a side section view along the section 1—1 shown in FIG. 2 of a blocking ram having its tail or distal section constructed according to the present invention;

FIG. 2 is a partial section view along 2—2 of FIG. 1;

Figure 4:
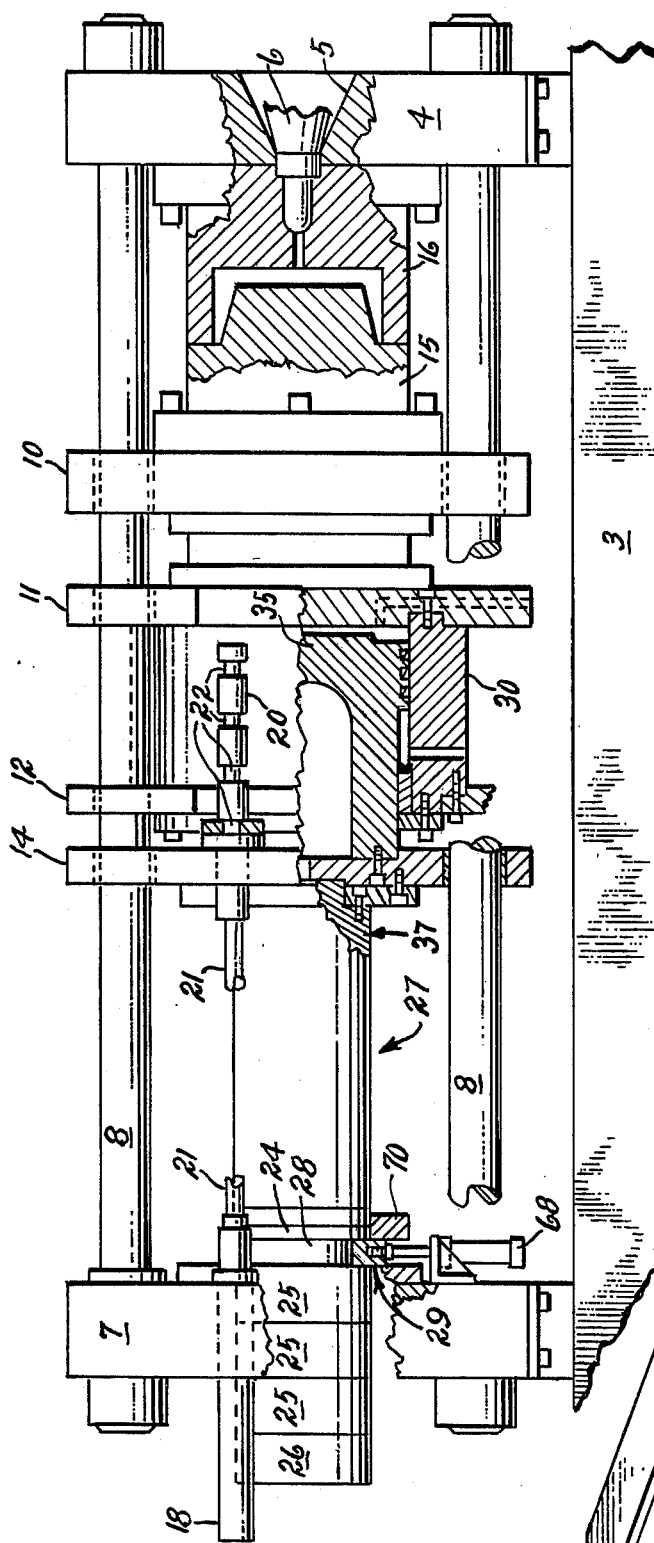
FIG. 4 is a side view in partial section or cutaway of the clamping section of a typical large clamping tonnage injection molding machine (i.e. it omits the plastication-injection unit and is for a machine of about 1000 tons clamping force or a larger) with the lock moving means shown 90° out of location.

It will be appreciated that FIG. 4 illustrates a representative environment in which the invention of the other Figures is preferably used.

In FIG. 4 is shown a base plate 3 on which is mounted a fixed platen 4 having therein — as is commonly known — a nozzle entry port 5 to receive the nozzle 6 of the plastication and injection unit which latter are not illustrated. A backplate 7 is secured to the other end of the baseplate. A plurality of tie rods 8, ordinarily four arranged in rectangular and preferably square fashion extend between the fixed platen 4 and the backplate 7. Slidably mounted on the tie rods 8 are a moving platen 10, a front cylinder support plate 11, a rear cylinder support plate 12, and a ram support plate 14. As is well-known the mold parts 15, 16 are mounted respectively to the fixed and moving platens.

A pair of traversing cylinders 18 are mounted on the backplate symmetrically about the machine center line and provide means for rapidly advancing and retracting all the support plates and moving platens in order to open and close the mold. The front end 20 of the traverse cylinder rod 21 is fashioned with a plurality of grooves 22 cut therein to act as locating means so that the machine can be set up for molds of different heights. Four such grooves 22 are illustrated.

On the rear segment 23 (FIG. 1) of the blocking ram 27 are a plurality of case iron rings 24, 25, 25, 25, 26 spaced in such a way as to permit locking the ram by engaging the lock recess or space 28 with a pair of locks 29. Each of the traverse cylinder grooves 22 has a corresponding lock opening or space 28 between two of the rings. Thus, there are a face ring 24, three slidable rings 25, one retaining ring 26 to provide four positions for space 28, each position corresponding and coacting with one of the four traverse rod grooves 22. The respective groove 22 and recess 28 are selected when the machine is being set up for a particular mold with its particular height adjustment.

Thus, the recess 28 is defined immediately to the rear of the lock engaging rear face on whichever ring becomes the compression ring when the system is operational. For example, in FIG. 1, the rear face of ring 24 is immediately adjacent the recess and the other side of the recess is defined by the front face of ring 25.

A hydraulic cylinder 30 is supported between the two cylinder support plates 11, 12. This cylinder 30 moves forward (responsive to the traverse cylinders) relative to the locked-in-place-ram to carry with it the moving platen, thereby closing the mold 15, 16 and maintaining pressure sufficient to hold the mold closed during an injection operation.

Within the cylinder is a hydraulic piston 35, sometimes called a pancake piston. The blocking ram 27 is secured into the rear of this piston 35. The forward end 37 of the blocking ram is also mounted on the ram support plate 14 while the rear end of the blocking ram with the locking rings 24 . . . 26 thereon passes through the back plate.

Referring again to FIGS. 1-4, the improved blocking ram assembly 27 includes tubular or flanged sleeve-like rear segment 23 preferably of magnetic material most preferably of steel on which is mounted a plurality of ductile cast iron spacer rings 24 . . . 26 and a front section 37. The ram is secured to the moving platen 10 and extends longitudinally of the machine to where the rear segment is secured thereto by a plurality of bolts 45. The rear segment 23 has a preferred structure that includes a sleeve section 46 having a cylindrical outer portion over most of its length and a flanged section 47 at its front end so that it can be attached to a mating part of the blocking ram by the bolts 45.

Each of the plurality of movable annular spacer rings 25 has an outer diameter 48 substantially that of the ram front section 37, a predetermined longitudinal (that is, longitudinal of the machine) dimension 49, front and rear faces 50, 51 that are substantially parallel, an inner diameter 52 approximately but slightly larger than that of the sleeve portion whereby sufficient clearance is provided to enable sliding each ring back and forth on the tail section without any play to speak of and a tool hole 54 drilled radially partly through the wall.

The lock recess 28 provides engagement with the lock 29 and is defined by the longitudinal dimension between opposing faces on any two adjacent rings 24 . . . 26. The lock recess is maintained in the preferred embodiment by making the rear segment out of steel and then providing the magnetic spacer block 44 that is secured magnetically between any two of said rings. Preferably spacer blocks 44 are placed as illustrated in FIG. 4, with one at the bottom and one at the top of the lock recess.

Ductile or nodular cast iron has been found to be an eminently suitable material for the rings 24 . . . 26. It is economical, extremely strong in compression whereby it can resist the compressive forces during clamping, and is readily machined. Each ring 25 has at least one jack hole or tool hole 54 preferably drilled radially part of the way through the annular wall of the ring. Each such tool hole is used to position the rings 25 by rotating one ring relative to another by insertion in the hole 54 of a small (⅛ inch diameter) rod in a hole and applying a tangential force. This provides a simple and easy way to separate rings which may otherwise be stuck together by reason of the tremendous forces engendered in machines of this size.

The inner annular face of each sliding ring 25 preferably has a grease groove 55 therein. The tool hole 54 should not communicate with this grease groove. The purpose of the grease groove is to receive and retain enough lubricants so that corrosion is minimized but movement of the rings in setting up a machine is facilitated.

Grease is fed into the aforesaid grease grooves through a grease fitting 57 that communicates with a grease bore 58 formed through the end cap 26 and feeds directly and unrestrictedly into the grease passage 59 in the blocking ram rear segment. Short radial passage 60 permit grease to enter the grease grooves 55 from the grease passageway 59.

One of the rings is the retaining cap 26 which is preferably bolted onto the end of the rear segment. The forward face 63 on this retaining cap is machined to be parallel with the front and rear faces 50, 51 on the rings 25.

The flanged portion 47 preferably has a face ring 24 secured to its rear face by a plurality of short bolts 64. The face ring has a rear face 65 substantially parallel to the faces on the other rings.

Each lock member 29 is moved laterally of the machine by a lock moving means comprising the small double acting hydraulic cylinder 68 in such a way as to engage the lock recess 28. One such lock 29 and its operating cylinder 68 is provided on each side of the molding machine so that the forces are symmetrically received and applied to the blocking ram. Each lock 29 is slidably mounted between a lock plate 70 and the back plate 7, both of the latter being spaced apart by spacers 69.

The construction described in the preceding paragraph is not novel and in fact is common in the hydraulic injection molding machine art. The novel lock assembly construction and its manner of use is described in the following two paragraphs.

Each lock 29 when viewed as in FIG. 2, has the shape which enables it to be moved into the locking recess 28 as heretofore described. Each lock has a central jaw portion 75 between a pair of end portions 76 located at opposite ends of the lock. The jaw portion 75 has a radius 77 permitting it to fit the cylindrical shape of the ram sleeve 23 whereas the lock end surface 78 is formed by trimming off or cutting away, and is fitted with a brake shoe 79 which is secured to said end by a layer of adhesive 80. These lock end portions are arranged on a larger radius 81 such that the shoe thereon engages the outer cylindrical surface of the spacer rings, as shown in dotted lines at 81 in FIG. 2.

The reason for fitting each lock with a shoe 79 is to permit manually or selectively moving the locks 29 in to grip the outside of a selected one of the spacer rings (as at 81, FIG. 2) and then manually or selectively advancing or retracting the entire hydraulic ram and moving platen assembly using the machine's own power to relocate the spacer rings 25 and provide a lock recess at the place where desired. In other words, this is a feature which permits setting up the machine with a minimum of special tools by employing the machine's own power. As already noted, when a new lock recess has been established as above, the magnetic spacer blocks 44 are placed at the top and bottom of the recess in positions where they will not be struck by the locks and the locks are then disengaged from the outside of the spacer rings and then by appropriate selective manual operation of the machine moved into the new lock recess.

Figure 3:
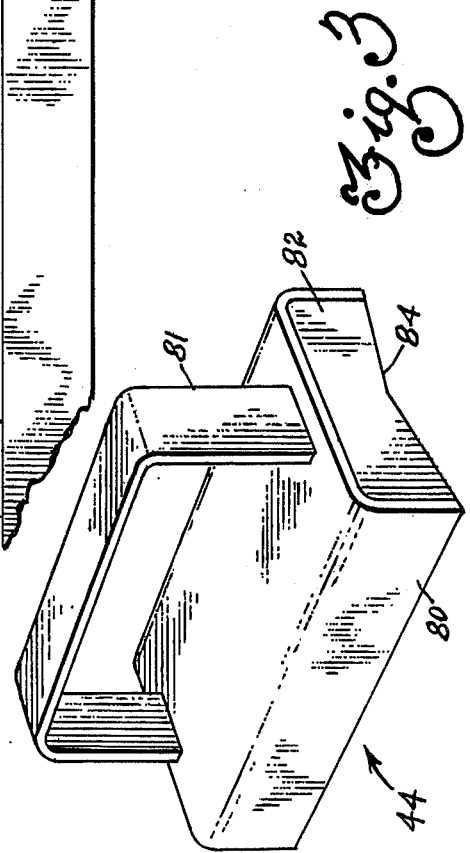
FIG. 3 is an isometric view of the magnetic spacer shown in FIGS. 1, 2.

The magnetic spacer 44 is preferably designed as in FIGS. 1, 2, 3. Preferably it has a channel shaped base 80 to which is secured a U-shaped handle 81 as by tack welding or brazing. Within the channel is secured an industrial magnet 82, preferably one of the size to require a 40 pound force in order to remove it from a steel surface. The magnet has a concave surface 84 — preferably in the shape of a shallow V — for cooperating with the cylindrical surface on the rear segment of the ram. The edges of the base channel are, as illustrated, beveled to coincide in slope with the magnet. The ends of the magnet should be cut to be square with the ram center line within the limit of industrial tolerances whereby the spacing function of the magnet can be achieved. The proportions of the magnet are such that it can fit in the space 28 between the locks (see FIGS. 1, 2, 4) at the top and bottom of the rear segment without engagement or crushing by the respective locks.

The machine is set up by selecting a groove 22 in the forward end 20 of the traverse cylinder rod 21 and securing the rod by that groove to the ram support plate 14. A locking opening or recess 28 is established between appropriate ones of the locking rings 24 . . . 26 on the rear of the ram. This is readily done by inserting a rod in the radial jack holes 54 of a ring 25 and turning it relative whereby the vacuum between any two such rings is broken. Once that is done, the rings 24 . . . 26 are moved apart by sliding 25 along the internal sleeve and the magnetic spacers 44 are placed therebetween to maintain the requisite recess 28.

To summarize, in FIGS. 1-4 the preferred ram construction includes an rear segment 23, a rear retaining ring 26, three slidable rings 25, each of which has a grease groove on its internal surface for lubrication, and a face ring 24. The groove is axially long enough so that movement of the ring back and forth during machine set up will maintain communication with the grease or other lubricant outlet.

In operation, the lock-and-block assembly is operated as already known, Generally, it is not engaged except when the moving platen has been moved to a mold-closed position at which time it engages. After a molding operation takes place, hydraulic liquid is admitted into the space behind the piston and thereby moves the cylinder, its support plates and the moving platen to the rear thereby opening the mold. When this movement is finished, or concurrently with it, the lock assembly disengages from the opening in the ram and the traverse cylinder moves the mold the rest of the way open.

I claim:

1. In a lock and block clamping force applying means for holding in a fully advanced position the movable platen of a hydraulic injection molding machine by engaging with a laterally moving lock to lock recess in the tail section of the blocking ram that moves longitudinally through the stroke of the machine and holds said platen, said lock fitting said lock recess to thereby block said ram and platen from any substantial movement away from said fully advanced position, an improved blocking ram construction that comprises:

a. said tail section having a cylindrical rear segment;
   b. a plurality of annular spacer rings mounted on said rear segment;
   c. a front section of said ram having a preselected diameter and which is secured to said moving platen and extends longitudinally a portion of the distance to said ram tail section;
   d. said rear segment having a cylindrical sleeve portion of a diameter less than said ram front section diameter;
   e. each ring of said plurality of annular spacer rings having an outer diameter substantially that of said ram front section, a predetermined longitudinal length, front and rear faces that are substantially parallel, and an inner diameter approximately but slightly larger than that of said sleeve portion, at least one of said rings being movable longitudinally on said cylindrical sleeve portion, the longitudinal dimensions of the respective rings providing means for mold height adjustment;
   f. said lock recess being provided by the longitudinal dimension between the opposing faces on any two selected rings and longitudinally of a size to receive said lock and located to the rear of the rear face of one of said rings;
   g. whereby said machine can be adjusted so its blocking ram moves to a preselected one of a number of predetermined advance positions which is coincident with the location of said recess whence said platen can be moved to said fully advanced position and, if molds be present, to hold the same closed while said lock and block construction resists opening of the mold during a molding procedure.

2. Apparatus according to claim 1, further including a spacer block mounted in said recess to the rear of the ring rear face defining the forward end of said recess said block being mounted where it will not be engaged by said lock when said lock is advanced into said recess.

3. Apparatus according to claim 2, wherein said cylindrical sleeve portion is made of magnetic material and said spacer block comprises a permanent magnet of a length substantially equal to the longitudinal dimension of said lock and said rear segment is made of magnetic material, said spacer block being secured magnetically in place on said cylindrical sleeve portion within said recess to thereby space apart said rings.

4. Apparatus according to claim 1, wherein at least one of said rings has therein a radially extending jackhole at least partially therethrough of a size sufficient to receive a tool therein whereby each said ring can be turned relative to each other when adjusting the machine for one of said predetermined advance positions by establishing a lock recess coincident with such position.

5. Apparatus according to claim 1 further including a retaining means at the distal end of said rear segment for retaining thereon said plurality of spacer rings.

6. Apparatus according to claim 5, further including substantially parallel faces on the forward face of said retainer and on the rear face of said ram front section which faces are in turn substantially parallel to those on said spacer rings whereby when said lock is in said lock recess a compression load can be supported by those faces forward of said lock which are engaged with each other or said lock.

7. Apparatus according to claim 5, wherein said retaining means comprises a cap ring secured to the distal end of said rear segment and having an outside diameter at least larger than the inner diameter of the rearmost one of said rings.

8. Apparatus according to claim 3 wherein said rear segment is made of steel and said spacer rings are made of cast iron.

9. Apparatus according to claim 1, wherein said plurality of spacer rings includes a face ring secured to said tail section forward of the remainder of said spacer rings, having an outer diameter substantially that of said rings and a rear face substantially parallel with the faces on said spacer rings whereby said lock recess may be established between said face ring and the forward one of said remainder of said spacer rings.

10. Apparatus according to claim 9, wherein said rear segment comprises a flanged tubular member wherein said cylindrical sleeve portion is located on said tubular part with said flange forward thereof, said flange being used to mount said segment on said ram front section, and said face ring being located against the rearwardly positioned flange face.

11. Apparatus according to claim 1, further including a grease groove around the inner annular face of at least one of said spacer rings.

12. Apparatus according to claim 11, further including a means mounted on said sleeve portion to deliver lubricant into said groove.

13. Apparatus according to claim 1, wherein said at least one longitudinally movable ring is disposed between two other said rings but spaced apart from one of said two rings to provide said lock recess, has a groove for receiving lubricant around its inner annular face, has a substantially radial jackhole partially through the wall thereof, and wherein said sleeve portion includes a means mounted thereon to deliver lubricant into said groove.

14. Apparatus according to claim 1, further including on said lock a central jaw portion to receive said rear segment cylindrical sleeve portion and a lock end surface contoured to frictionally engage the outer diameter of said at least one longitudinally movable ring.

15. Apparatus according to claim 14, further including a brake shoe material secured to said lock end surface.

* * * * *

UNITED STATES PATENT OFFICE
CERTIFICATE OF CORRECTION

PATENT NO. : 4,038,015
DATED : July 26, 1977
INVENTOR(S) : James E. Dawson

It is certified that error appears in the above-identified patent and that said Letters Patent are hereby corrected as shown below:

Column 5, line 48 the "," (comma) should be a --.-- (period); and column 5, line 62 "to" should read --a--.

Signed and Sealed this

Eighth Day of November 1977

[SEAL]

Attest:

RUTH C. MASON
Attesting Officer

LUTRELLE F. PARKER
Acting Commissioner of Patents and Trademarks